(No Model.)
N. O. SWANSON.
DRILL CHUCK.
No. 571,461.    Patented Nov. 17, 1896.
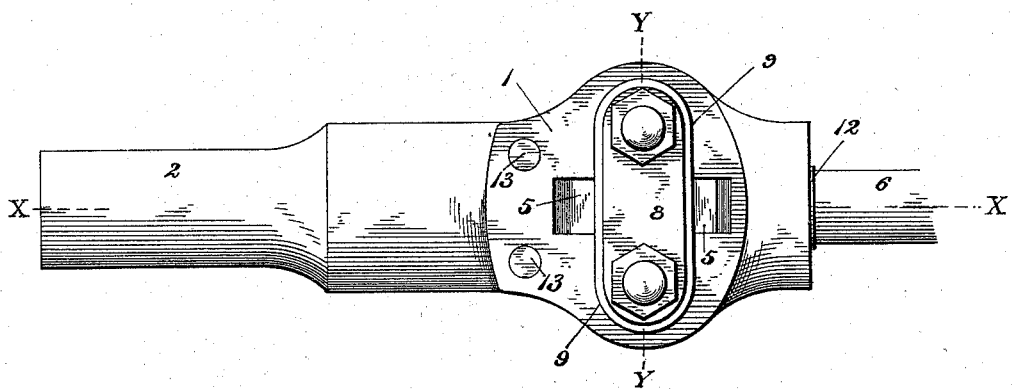
FIG. 1.
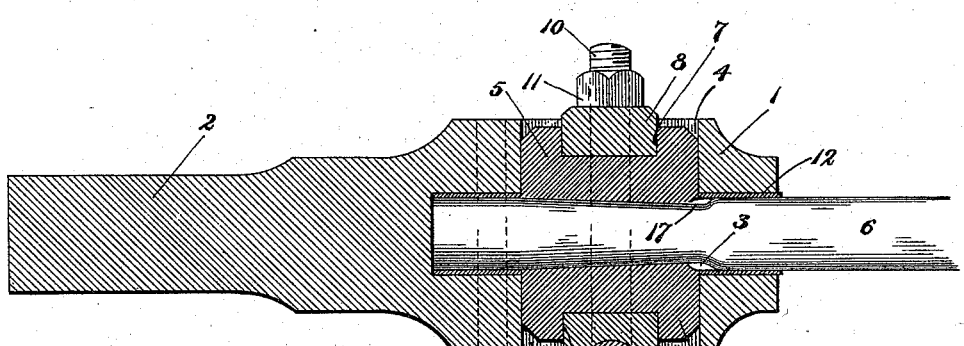
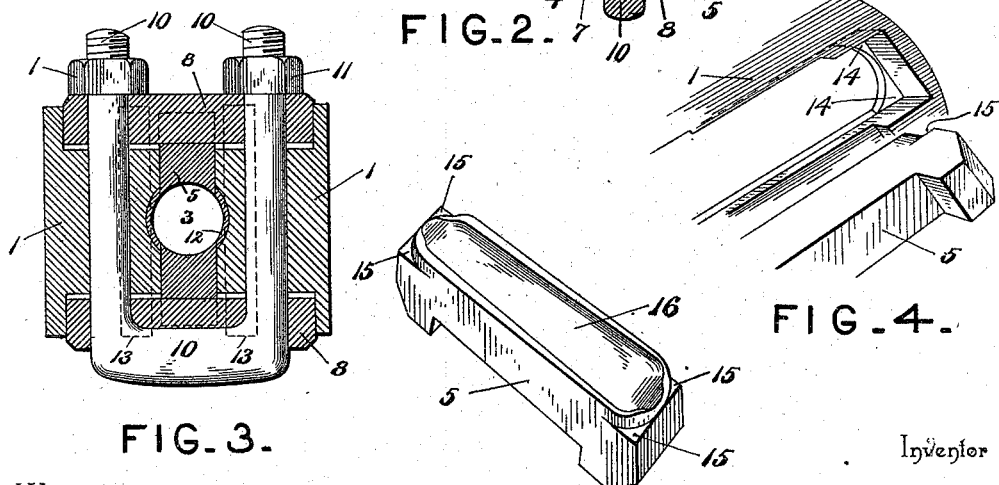
Witnesses
A. M. Poynton
V. B. Hillyard
Inventor
Nils O. Swanson.
By his Attorneys,
C. A. Snow & Co.

UNITED STATES PATENT OFFICE.

NILS OLOF SWANSON, OF LEAD, SOUTH DAKOTA.

DRILL-CHUCK.

SPECIFICATION forming part of Letters Patent No. 571,461, dated November 17, 1896.

Application filed February 14, 1896. Serial No. 579,291. (No model.)

*To all whom it may concern:*

Be it known that I, NILS OLOF SWANSON, a citizen of the United States, residing at Lead, in the county of Lawrence and State of South Dakota, have invented a new and useful Drill-Chuck, of which the following is a specification.

This invention has for its object to provide an improved chuck for securing drills or like tools to their operating-staff, so as to admit of the tools being readily interchanged when required, and which will center them and prevent looseness after the parts have been properly adjusted.

For a full understanding of the merits and advantages of the invention reference is to be had to the accompanying drawings and the following description.

The improvement is susceptible of various changes in the form, proportion, and the minor details of construction without departing from the principle or sacrificing any of the advantages thereof, and a full disclosure of the invention and adaptation thereof is shown in the accompanying drawings, in which—

Figure 1 is a side elevation of a drill-chuck constructed in accordance with this invention. Fig. 2 is a section thereof on the line X X of Fig. 1. Fig. 3 is a section on the line Y Y of Fig. 1. Fig. 4 is a detail view showing the means for limiting the inward movement of the dogs. Fig. 5 is a detail view of a dog.

Corresponding and like parts are designated and referred to in the following description and all the figures of the appended drawings by the same reference-characters.

The chuck comprises a head 1, having a stem 2, by means of which connection is had with the operating-staff or other means for operating the drill. A bore 3 extends longitudinally into the head for a short distance from its outer end, and a mortise 4, extending transversely of the head, intersects the bore 3 and is rectangular in shape and receives the dogs 5, by means of which the shank 6 of the drill or boring-tool is gripped. Each dog 5 is formed with a notch 7 in its outer edge or side to receive a yoke 8, by means of which pressure is transmitted to the dogs to compel them to clamp and hold the drill or tool in place. The yokes 8 extend at right angles to the dogs 5 and project beyond the sides thereof an equal distance and receive the fastenings by means of which the parts are secured after being assembled. Recesses 9 are provided in the opposite sides of the head 1 and intersect with the ends of the mortise 4 and receive the yokes 8, so as to retain the latter in place and prevent them from projecting too far beyond the sides of the head. The ends of the yokes 8 have openings which coincide with corresponding openings in the head 1 to admit of the passage of the fastenings employed for connecting the parts together. As shown, the fastenings consist of a shackle 10 and clamp-nuts 11, mounted upon the projecting threaded ends thereof. Obviously, single bolts can be employed with advantage for attaining the same end.

A bushing or sleeve 12 lines the bore 3 and is held therein in any convenient way, pins 13 being employed for the purpose and passing through openings in the head 1 and entering depressions or notches in the opposite sides of the said bushing. Openings are formed in the sides of the bushing to correspond with the mortise 4; but the ends of the said openings are curved, whereas the ends of the mortise are square, thereby forming corner projections 14, which serve as stops to limit the inner movement of the dogs 5, whereby the latter are prevented from interfering with the entrance of the shank 6 when thrusting the latter into the bore 3. It is not essential that this bushing or sleeve 12 be provided so long as the head is constructed to present the corner projections or stops 14, but the provision of the bushing or sleeve is a simple and practicable way of forming the said projections or stops 14, and for this reason is preferred.

Each dog 5 is a metal block of rectangular form having its inner side or face grooved to correspond with the bore 3 and having its ends beveled to provide for the easy insertion of the shank 6. The corner portions of each dog are cut away, forming shoulders or stops 15 to correspond with the corner projections 14, and engage therewith to limit the inner movement of the dogs. The grooves 16, formed in the inner faces or sides of the dogs 5, gradually widen and deepen toward the inner end of the bore 3 to correspond with the inclined portion 17 of the shank 6, whereby the shank is gripped and has imparted thereto a backward pressure, so as to hold its inner end close against the end of the bore 3, which is essential to secure the drill or tool firmly and in the exact center.

By loosening the clamp-nuts 11 the fastening employed for compressing the dogs against the sides of the tool-shank will be slackened and the drill or tool released, and the tool can be disengaged from the head or chuck by withdrawing it from the bore 3, and a new tool or drill can be substituted by thrusting its shank into the bore 3 and will be firmly held by again tightening the clamp-nuts 11, as will be readily understood.

Having thus described the invention, what is claimed as new is—

1. In a drill-chuck, the combination of a head having a longitudinal bore, a mortise intersecting with the bore, and recesses in the opposite sides of the head extending at right angles to and intersecting with the mortise, dogs fitted within the opposite end of the mortise upon each side of the bore and having notches in their outer sides, corresponding stops within the aforesaid mortise and upon the dogs for limiting the inward movement of the dogs, yokes placed in the recesses of the head and engaging with the notched sides of the dogs, and means for drawing the yokes together and securing them to the head, substantially as set forth.

2. A drill-chuck comprising a head having a longitudinal bore and a transverse mortise intersecting with the bore, the ends of the mortise being square, a bushing or sleeve secured in the bore of the head and having openings in its sides corresponding to the mortise, and having the ends of the said openings curved, whereby corner projections or stops are formed, dogs fitted in the end portions of the mortise and having their inner corners cut away to form shoulders or stops to engage with the corresponding corner projections formed by the bushing, and means for pressing the dogs inward against the sides of the drill or tool shank, substantially as set forth.

3. A drill-chuck constructed substantially as set forth, and comprising a head having a longitudinal bore, a transverse mortise intersecting with the bore, and recesses in the sides of the head intersecting with and extending at right angles to the mortise, a bushing or sleeve fitted within the bore of the head and having openings corresponding with the mortise, and having end portions extending into the mortise to form stops, dogs fitted in the mortise upon opposite sides of the bore and having shoulders at their ends to engage with the projecting portions of the sleeve, whereby the inward movement of the dogs is limited, said dogs having notches in their outer sides and having their inner faces grooved and inclining toward the inner end of the bore, yokes placed in the recesses in the sides of the head and engaging with the notched sides of the dogs, and a shackle and clamp-nuts for connecting the parts and clamping the dogs against the shank of the tool or drill, substantially as set forth.

In testimony that I claim the foregoing as my own I have hereto affixed my signature in the presence of two witnesses.

NILS OLOF SWANSON.

Witnesses:
WALTER McKAY,
JOHN M. SWANSON.